O. FRANKMAN.
MOTOR DRIVEN AGRICULTURAL MACHINE.
APPLICATION FILED OCT. 25, 1919.

1,381,816.

Patented June 14, 1921.

Inventor
Olof Frankman
by
Atty

UNITED STATES PATENT OFFICE.

OLOF FRANKMAN, OF MALMO, SWEDEN.

MOTOR-DRIVEN AGRICULTURAL MACHINE.

1,381,816.  Specification of Letters Patent.  Patented June 14, 1921.

Application filed October 25, 1919. Serial No. 333,339.

*To all whom it may concern:*

Be it known that I, OLOF FRANKMAN, estate owner, a citizen of the Kingdom of Sweden, and residing at Malmo, Sweden, have invented a new nad useful Improvement in Motor-Driven Agricultural Machines; and I do hereby declare the following to be a full, clear, and exact description of the same.

The agricultural machines of recent design are usually driven by means of motors so as to raise their working capacity, while their weight being accordingly increased, calls for an enlarged width of the driving and supporting wheel rims. When using such broader wheels the managing of the machine is however more difficult and a large ground surface is required for turnings. It is true that the managing is facilitated if the wheel rims are convex, but as the wheels are used not only for supporting but also for driving the machine such wheels easily dig down in the ground and therefore this construction cannot be used.

The present invention has for its object to facilitate the managing and steering of the machine when using common cylindrical wheels and the main feature thereof is that the wheel according to its smaller or greater width is divided in a smaller or greater number of parts in planes perpendicular to the axle. When a number of separate cylindrical wheels are placed side by side, they are provided with clutches by means of which they may be connected to a single unit, and by disconnecting the clutches the wheels are released from each other and act separately.

Figure 1:
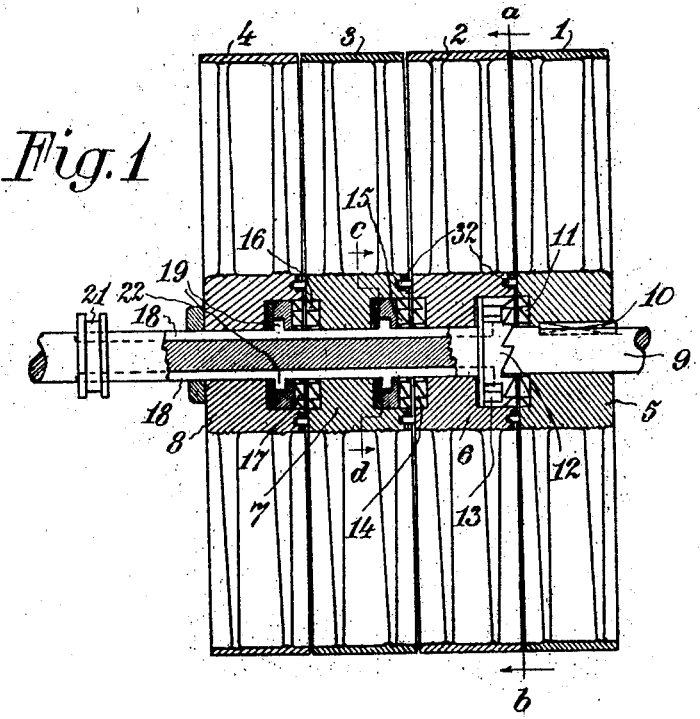
Figure 2:
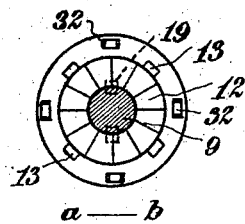
Figure 3:
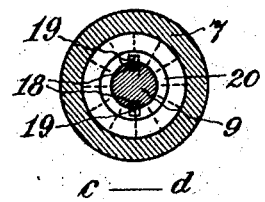

The invention is illustrated in the accompanying drawings wherein Figure 1 shows a longitudinal section parallel to the shaft. Fig. 2 shows a section on the line *a—b* and Fig. 3 another section on the line *c—d* both lines in Fig. 1.

According to Fig. 1 the whole wheel consists of four parts or narrower wheels provided with rims 1, 2, 3 and 4 and hubs 5, 6, 7 and 8. These narrower wheels or wheel parts are mounted on a common shaft 9 in such a way that all the rims together practically formed a whole cylinder. The shaft 9 is intended to be driven from the motor by means of a suitable gear and one of the outer wheel parts, *i. e.* 1, is fixed to the shaft by means of a key 10 or equivalent means, so that said wheel part is always rotating with the shaft. The side of the hub 5 facing the adjacent hub 6 is formed with a fixed clutch 11, and within a central bore in the hub 6 a corresponding disengaging clutch 12 is slidably mounted, which latter is prevented from rotating within the hub 6 in a suitable manner, *i. e.*, by means of keys 13 extending in longitudinal grooves in said hub in such a way that the clutch 12 is not prevented from sliding longitudinally. The side of the hub 6 facing the hub 7 is formed in the same manner with a clutch member 14. Within the latter hub is mounted a slidable clutch member 15, and the hubs 7, 8 are provided with similar clutch members 16, 17.

The shaft 9 is provided with a number of longitudinal grooves, *i. e.* two grooves placed diametrically opposite each other, in which are slidably mounted bars 18 provided with shoulders 19 extending into annular grooves 20 formed in the disengageable clutch members, and thus said clutch members may be coupled to the clutch members fixed to the wheel parts by sliding the bars. Because of the annular grooves 20 the slidable clutch members are not prevented from rotating upon the axle 9 when the clutches are disengaged. For sliding the bars 18 and the movable clutch members said bars are connected with a double flanged disk 21 made to slide on the shaft, and in order to prevent the sliding of the wheel parts a set collar 22 or the like is fixed to the shaft (Fig. 1).

It will be understood that the particulars described above are to be considered only as suitable means for carrying out the invention in practice and that said means without departing from the invention may be changed for equivalents.

The wheel unit may consist of three or any other odd number of wheel parts, or it may have an even number of wheel parts, in either case one of the center wheel parts may be fixed to the shaft as desired.

In the devices described above all of the wheel parts are coupled together when the agricultural machine is performing its work and the motor then has the greatest driving effect upon the machine. When the machine is to be turned around the necessary power may obviously be diminished because the working parts are usually stopped and then all of the wheel parts are disengaged from the driving gear with the exception of a single one, which is sufficient for driving the machine forward during the turning. During all circumstances the supporting capacity of the wheel unit remains constant and is equal to the sum of the supporting capacities of all the parts therein.

In order to diminish the friction between the hubs when the wheel parts are rotating relatively to each other rollers 32 or the like are arranged as shown in Figs. 1 and 2.

Having now described my invention and the manner in which the same is to be performed I declare that what I claim is:—

1. A motor-driven agricultural machine including a shaft, a series of wheels adjacently mounted thereon, one of said wheels being mounted to rotate with the shaft, the remaining wheels being rotatably mounted on said shaft, the wheels having hubs and coöperable means carried thereby, whereby motion imparted to the shaft and fixed wheel may be applied to the rotatable wheels by operating the coöperable means.

2. A motor-driven agricultural machine including a shaft, supporting and driving wheels mounted thereon, one of said wheels being keyed to the shaft, the remaining wheels being rotatable thereon, the wheels having hubs formed with clutch members on one face the opposite faces of all but the first mentioned hub being formed with a recess, clutch members slidably mounted therein, and adapted to coact with the first mentioned clutch members and means for operating the second-mentioned clutch members, whereby motion transmitted to the shaft and first mentioned wheel may be transmitted to the remaining wheels by operating the clutch members to coact.

3. A driving and supporting mechanism including a shaft, wheels mounted on said shaft, one of the wheels being fixed thereon, the remaining wheels being rotatable on the shaft, the wheels having hubs, clutch members carried by the hubs around the shaft and means carried by the shaft for operating the clutch members, whereby motion imparted to the shaft and fixed wheel may be transmitted to the remaining wheels by operating the clutch members of each wheel to engage with the clutch members of the other wheels and the fixed wheel.

4. A supporting and driving device comprising a shaft, a plurality of wheels mounted thereon, one of said wheels being keyed to the shaft, the remaining wheels being rotatably mounted thereon, part of the wheels having one face of their hubs formed with clutch teeth, the opposite faces of the hubs having recesses therein, clutch members slidably mounted in the recesses, the shaft being formed with longitudinal grooves, clutch operating members slidably mounted in the grooves, having fingers adapted to engage the second-mentioned clutch members and rollers mounted in one face of each hub and projecting beyond the hub, for engagement with the adjacent hub, whereby the clutch operating members may be moved to engage the clutch members for transmitting motion from the fixed wheel to the rotatable wheels.

In testimony whereof I have signed my name to this specification in the presence of two subscribing witnesses.

OLOF FRANKMAN.

Witnesses:
T. G. BRANZELL,
GUNHILD PETERSSON.